US012418085B2

(12) United States Patent
Kirkeby et al.

(10) Patent No.: US 12,418,085 B2
(45) Date of Patent: Sep. 16, 2025

(54) CIRCULATOR DESIGN AND METHODS OF FABRICATING THE CIRCULATOR

(71) Applicant: TTM Technologies, Inc., Santa Ana, CA (US)

(72) Inventors: Niels Husted Kirkeby, Santa Ana, CA (US); Brady Fitzgerald, Santa Ana, CA (US); Michael Len, Santa Ana, CA (US); Thomas Lingel, Santa Ana, CA (US); Mark Bowyer, Santa Ana, CA (US); Benton O'Neil, Santa Ana, CA (US)

(73) Assignee: TTM Technologies, Inc., Santa Ana, CA (US)

(*) Notice: Subject to any disclaimer, the term of this patent is extended or adjusted under 35 U.S.C. 154(b) by 210 days.

(21) Appl. No.: 17/965,680

(22) Filed: Oct. 13, 2022

(65) Prior Publication Data

US 2023/0125826 A1 Apr. 27, 2023

Related U.S. Application Data

(60) Provisional application No. 63/270,456, filed on Oct. 21, 2021.

(51) Int. Cl.
*H01P 1/387* (2006.01)
*H01P 1/38* (2006.01)
*H01P 11/00* (2006.01)

(52) U.S. Cl.
CPC ................ *H01P 1/38* (2013.01); *H01P 1/387* (2013.01); *H01P 11/00* (2013.01)

(58) Field of Classification Search
CPC .. H01P 1/387; H01P 1/383; H01P 1/38; H01P 1/32; H01P 1/36
See application file for complete search history.

(56) References Cited

U.S. PATENT DOCUMENTS

| | | | |
|---|---|---|---|
| 3,621,476 | A | 11/1971 | Kanbayashi |
| 4,703,289 | A | 10/1987 | Kwitkowski et al. |
| 4,740,762 | A | 4/1988 | Powers et al. |
| 5,898,346 | A | 4/1999 | Kamei et al. |
| 8,040,199 | B2 | 10/2011 | Carr et al. |
| 9,136,572 | B2 | 9/2015 | Carr et al. |

(Continued)

FOREIGN PATENT DOCUMENTS

| | | | |
|---|---|---|---|
| EP | 0381412 | A2 | 8/1990 |
| EP | 0381412 | A3 | 8/1990 |
| JP | 58-116790 | A | 7/1983 |

OTHER PUBLICATIONS

Krivic et al., "Design and Fabrication of the Bosma Stripline Circulator in LTCC Technology," 2015 IEEE International Conference on Microwaves, Communications, Antennas and Electronic Systems (COMCAS), Nov. 2, 2015 (5 pages).

(Continued)

*Primary Examiner* — Stephen E. Jones
(74) *Attorney, Agent, or Firm* — Polsinelli PC

(57) ABSTRACT

A circulator for radio frequency is provided. The circulator may include a ferrite stripline assembly, which includes a first ferrite layer, a second ferrite layer over the first ferrite layer, and a junction circuit between the first ferrite layer and the second ferrite layer. The circulator may also include a magnet over the second ferrite layer for providing magnetic bias.

21 Claims, 11 Drawing Sheets

(56) References Cited

U.S. PATENT DOCUMENTS

| | | | | |
|---|---|---|---|---|
| 9,899,717 | B2 | 2/2018 | Bedinger et al. | |
| 10,847,857 | B2 | 11/2020 | Lynch et al. | |
| 2002/0093392 | A1 | 7/2002 | Ohata et al. | |
| 2005/0007206 | A1 | 1/2005 | Kocharyan | |
| 2005/0052256 | A1* | 3/2005 | Hasegawa | H01P 1/36 333/1.1 |
| 2009/0243746 | A1* | 10/2009 | Kocharyan | H01P 11/00 333/1.1 |
| 2011/0068877 | A1* | 3/2011 | Chawla | H01P 1/387 333/1.1 |
| 2011/0193649 | A1 | 8/2011 | Popelka et al. | |
| 2013/0321090 | A1 | 12/2013 | Cruickshank et al. | |
| 2017/0294696 | A1 | 10/2017 | Cruickshank et al. | |
| 2019/0382316 | A1 | 12/2019 | Hill et al. | |

OTHER PUBLICATIONS

Extended Search Report for corresponding EP Application No. 22202118.0 issued Feb. 21, 2023 (15 pages).

* cited by examiner

CIRCULATOR DESIGN AND METHODS OF FABRICATING THE CIRCULATOR

CROSS-REFERENCE TO RELATED PATENT APPLICATIONS

This patent application claims the benefit under 35 U.S.C. § 119(e) of U.S. Patent Application Ser. No. 63/270,456, entitled “CIRCULATOR DESIGN AND METHODS OF FABRICATING THE CIRCULATOR,” filed on Oct. 21, 2021, which is incorporated herein by reference in its entirety.

FIELD

The disclosure is directed to a junction circulator design and methods for fabricating the circulator. In particular, the circulator includes a ferrite stripline assembly.

BACKGROUND

A $5^{th}$ generation (5G) mobile phone network uses beam steering and multiple input and multiple output (MIMO) techniques and includes amplifiers for transmitters. Each amplifier is associated with a circulator.

It is desirable to have the circulator as small as possible, both in an x-y plane and in a z-direction perpendicular to the x-y plane. The dimension along the z-direction is referred to as profile height for the circulators. The conventional circulators are often large, which is due to the need to have a housing strong enough to provide a compression force for assembling ferrites, circuits, and magnet(s) for the circulators. The ferrites are ceramic materials including iron oxide ($Fe_2O_3$) and are soft magnetic. The magnet(s) can be a ceramic or rare-earth magnet and are hard magnetic. The circuits can be any good conductor. Typically, the circuits use copper, bronze, or silver. Circulator constructions may also have a variety of temperature compensation metal plates, steel pole pieces, and housing. The soft-magnetic ferrites are magnetically biased by a static magnetic field that sets the properties of an radio frequency (RF) tensor permeability that ultimately enables non-reciprocal operation of a device. Often, the circulator is the tallest component in the amplifiers for transmitters on a printed circuit board (PCB). As a result, the circulator affects the size of the overall antenna array.

There remains a need to develop methods for reducing the size of the circulators and product costs.

BRIEF SUMMARY

In one aspect, a circulator for radio frequency is provided. The circulator may include a ferrite stripline assembly including a first ferrite layer, a second ferrite layer over the first ferrite layer, and a junction circuit between the first ferrite layer and the second ferrite layer. The circulator may also include a magnet over the second ferrite layer for providing magnetic bias.

In some variations, the ferrite stripline assembly may include a metal seed layer over all surfaces of each of the first ferrite layer and the second ferrite layer.

In some variations, the metal seed layer is between the junction circuit and the first ferrite layer or between the junction circuit and the second ferrite layer.

In some variations, the junction circuit may further include a first circuit formed on top of the first ferrite layer, a second circuit formed on bottom of the second ferrite layer, and an intermetallic bond formed between the first circuit and the second circuit.

In some variations, the first and second ferrite layers are attached by an intermetallic bond or a paste.

In some variations, the intermetallic bond comprises one of indium, preform of solder, or solder dots.

In some variations, the circulator may include an input port and an output port coupled to a perimeter of the first ferrite layer.

In some variations, the circulator may include one or more perimeter port leads coupled to the perimeter of the first ferrite layer to connect the junction circuit to the input port and the output port.

In some variations, the ferrite stripline assembly may further include a bottom ground layer under the first ferrite layer and opposite to the junction circuit and a top ground layer between the second ferrite layer and the magnet, the top ground layer opposite to the junction circuit.

In some variations, the ferrite stripline assembly may further include one or more perimeter grounds on sides of the first ferrite layer and the second ferrite layer, the one or more perimeter grounds coupled to the bottom ground layer and the top ground layer.

In some variations, the circulator may further include a pole piece between the magnet and the second ferrite layer to form a magnetic bias assembly comprising the magnet and the pole piece.

In some variations, the circulator may further include clips forming a magnetic return path and encapsulating the ferrite stripline assembly and the magnet.

In another aspect, a method of fabricating a circulator assembly is provided. The method may include depositing a seed layer over all surfaces of a first ferrite layer and a second ferrite layer by sputtering. The method may also include plating a metal on all seeded surfaces of the first and second ferrite layers. The method may also include applying a photomask to all plated surfaces of the first and second ferrite layers. The method may also include imaging masked top and bottom surfaces and three partial areas of a perimeter surface of the first and second ferrite layers. The method may also include etching away an exposed portion of the plated layer and seed layer to reveal a junction circuit comprising ground planes on each of the first and second ferrite layers, port features on at least one of the first and second ferrite layers, and plating an intermetallic bond on at least one of the first or second ferrite layers. The method may further include aligning the first and second ferrite layers with the junction circuit facing each other, activating the intermetallic bond to form a ferrite stripline assembly, and attaching a magnet to the top of the ferrite stripline assembly.

In some variations, the method may further include attaching a pole piece to the top of the ferrite stripline assembly, wherein the pole piece is between the magnet and the top of the ferrite stripline assembly.

In some variations, the method may further include forming a magnetic return path encapsulating the ferrite stripline assembly and the magnet.

In some variations, the junction circuit comprises a first circuit formed on top of the first ferrite layer, a second circuit formed on bottom of the second ferrite layer, and an intermetallic bond formed between the first circuit and the second circuit.

In some variations, the intermetallic bond is a diffusion bond.

In some variations, the intermetallic bond comprises one of indium, preform of solder, or solder dots.

In some variations, an input port and an output port are coupled to a perimeter of the first ferrite layer.

In some variations, one or more perimeter port leads are coupled to a perimeter of the first ferrite layer to connect the junction circuit to the input port and the output port.

Additional aspects and features are set forth in part in the description that follows and will become apparent to those skilled in the art upon examination of the specification or may be learned by the practice of the disclosed subject matter. A further understanding of the nature and advantages of the disclosure may be realized by reference to the remaining portions of the specification and the drawings, which form a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

Figure 1:
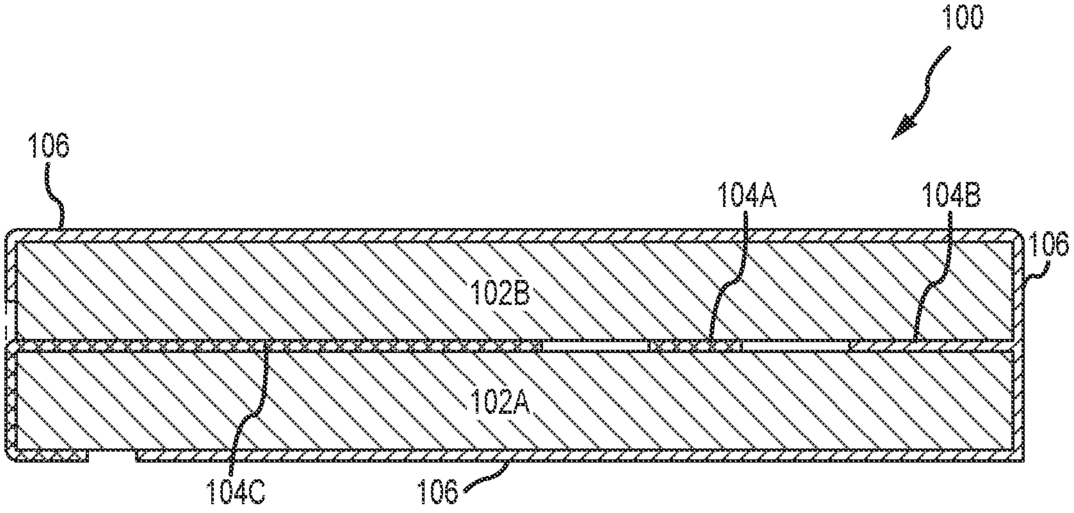
FIG. 1 illustrates a ferrite stripline assembly of a junction circulator according to one aspect of the disclosure.

The disclosure may be understood by reference to the following detailed description, taken in conjunction with the drawings as described below. It is noted that, for purposes of illustrative clarity, certain elements in various drawings may not be drawn to scale.

The 5G network includes a large number of circulators, for example, 64 circulators. The circulators are used to transmit an incident wave, which may enter from any port to the next port, according to a certain direction confirmed by a static bias magnetic field. It is a nonreciprocal device coupled to several ports. The circulators include a ferrite circulator, which has one-way transmission due to the use of a ferrite material. The ferrite circulators are often used as a duplexer. The operation of circulators can be compared to a revolving door with three entrances and one mandatory rotating sense. Energy from the transmitter rotates either clockwise or anti-clockwise to the antenna port, depending on the direction of the magnetic bias.

Conventional circulators require a compression force to keep the stripline assembly and magnetic bias source constructions in place. Also, to reduce insertion loss and enhance intermodulation distortion (IMD) performance, junction circuits and ground planes in the conventional circulator need to be in intimate contact with the ferrite discs or layers. However, with compression, the ferrite discs may crack either during assembly or while in operation in the conventional circulator. Cracked ferrites, even hairline fractures, may cause issues in insertion loss and intermodulation distortion (IMD) performance because cracked ferrites create a magnetic boundary. To avoid cracking, all elements of the stripline assembly construction and magnetic bias source are very flat to avoid pressure points. In addition, components such as a tub and a lid, are very flat and the compression mechanism of the housing provides uniform and controllable compression. Thus, production costs including the materials and processes used in the construction increase for the conventional circulators.

The disclosure relates to a junction circulator or a circulator assembly in which the junction circuit is formed directly on two ferrites. The junction circuit functions to bond the two ferrites together, such that the circulator assembly does not use compression from a housing. The disclosure addresses the need for a lower profile height and smaller size circulators in the 5G massive MIMO antenna/transceiver systems.

The disclosed circulator assembly solves many problems of the conventional circulators, by forming a self-contained ferrite stripline assembly, having two ferrites with junction circuits formed on one or multiple faces that are bonded together. Furthermore, the junction circuits on multiple faces provide an RF (Radio Frequency) ground at any desired location on the ferrite stripline assembly. Furthermore, by forming junction circuits directly on the ferrites, the disclosed circulator assembly may provide non-connected or isolated junction circuitry features, as desired.

The disclosed circulator assembly has a lower profile height than the conventional circulator. The disclosed circulator assembly reduces the profile height by eliminating housing. The housing can be eliminated, especially in a low-field device operating below ferro-magnetic resonance (FMR). The housing can also be replaced by a simpler housing to function as a magnetic return path than the conventional circulators. The disclosed circulator assembly accomplishes the low profile with simpler low-cost construction that includes fewer pieces and less stringent tolerances than the conventional circulators.

The disclosed circulator assembly also eliminates housing cavity resonance for the conventional circulator. The disclosed circulator assembly also includes fewer pieces, easier assembly with a higher yield, and more consistent performance than the conventional circulators. The disclosed circulator assembly also eliminates electrical tuning.

FIG. 1 illustrates a ferrite stripline assembly according to one aspect of the disclosure. As shown, a ferrite stripline assembly or a stripline circulator assembly 100 includes a bottom ferrite layer 102A or a first ferrite layer, a top ferrite layer 102B or a second ferrite layer, and a circuit layer or junction circuit 104 between the bottom ferrite layer 102A and the top ferrite layer 102B. The circuit layer or junction circuit 104 includes a first portion 104A including unconnected circuitry, a second portion 104B including circuitry connected to the ground, and a third portion 104C including circuitry connected to a port. The junction circuit 104 is substantially flat.

In some variations, the stripline circulator assembly 100 may include a metal seed layer (not shown) on all surfaces of the first and second ferrite layers, including a top surface, a bottom surface, and a side surface of the first and the second ferrite layers.

The stripline circulator assembly 100 is self-contained. The ferrite layers 102A-B are attached by either a thick film paste or through intermetallic bonding. According to one aspect, the ferrite layers 102A-B may be formed of copper-plated ferrites and may be joined through intermetallic bonding. The stripline circulator assembly 100 may also include perimeter face circuitry (not shown). The stripline circulator assembly forms a substantially homogeneous medium with a circuit substantially in the x-y plane between two ground planes (electrical walls), which are also substantially in the x-y plane. When applying a static magnetic field substantially perpendicular to the x-y plane the medium supports two modes, each mode with its own propagation velocity. If a counter-clockwise operation is desired, the circuit is designed and the magnetic bias strength and direction are set such that $L(2\beta_{-}-\beta_{+})=2N\pi$ and $L(2\beta_{+}-\beta_{-})=(2M-1)\pi$, where $\beta_{-}$ is the phase velocity of the mode traveling clockwise, $\beta_{+}$ is the phase velocity of the mode traveling counter-clockwise, L is the length the wave travels from one port to the adjacent port and N and M are any integer numbers>0. This is to say that the stripline circulator assembly is designed such that the clockwise mode travels twice as far as the counter-clockwise mode to arrive in phase at the counter-clockwise adjacent port for power to add up, thus waves add up at the adjacent counter-clockwise port whereas the waves cancel out at the adjacent clockwise port. If a clockwise operation is desired, then this is reversed, typically simply by reversing the direction of the magnetic bias.

To fully utilize the area of the ferrite, junction circuit 104 can have features (e.g., port matching stubs or resonator stubs) as close to the edge of the ferrite as possible. However, as junction circuit 104 approaches the edge, the effective dielectric constant changes dramatically due to proximity to air. Thus, the closer the junction circuit 104 is toward the edge of the ferrite 102A-B, the accuracy of the placement of the junction circuit 104 relative to the ferrite is more critical. By forming the circuit 404A-B directly on the ferrite this can be accurately aligned and no subsequent assembly misalignment can occur.

The ferrite stripline assembly 100 also includes a radio frequency (RF) ground 106 on the top of the top ferrite layer 102B and the bottom of the bottom ferrite layer 102A. The ferrite stripline assembly 100 also includes perimeter ground 106 on the sides of the top and bottom ferrite layers 102B and 102A. The RF ground 106 connects to the second portion 104B of the circuit layer 104.

The ferrite stripline assembly 100 forms junction circuit 104 and ground wrap/planes 106 directly on ferrite surfaces and thus eliminates any gaps that can be formed when any deviation occurs from flat junction circuits or ferrites.

The ferrite stripline assembly 100 also introduces an optional perimeter metallization directly formed on the ferrites, which effectively separates the air surrounding the ferrite from the ferrite itself and thus maintains a consistent dielectric constant to the edge. The ferrite stripline assembly 100 forms the metalized ground plane 106 on perimeters of the ferrites, thus placing a resonant mode above the operating band of the circulator and making the resonant mode independent of any housing.

The ferrites 102A-B provide mechanical support to the junction circuit 104 because junction circuit 104 forms directly on the ferrites 102A and 102B. Therefore, the junction circuit 104 can be thinner than the conventional circulators. With the thinner junction circuit 104, the fabrication tolerances can be reduced, leading to reduced variations in performance.

The ferrite stripline assembly 100 controls the resonance mode and/or evanescent modes often found within housing structures. The ferrite stripline assembly also has a shorter RF ground path, tighter tolerances, more consistent performance, and less tuning than the conventional circulators.

By way of example, the housing of the conventional circulator, regardless of shape, creates a ferrite-loaded cavity in which cavity modes can be excited and negatively impact circulator performance. The cavity modes can be excited by even very small gaps between ferrites and junction circuits, or between ferrites and ground planes.

Figure 2:
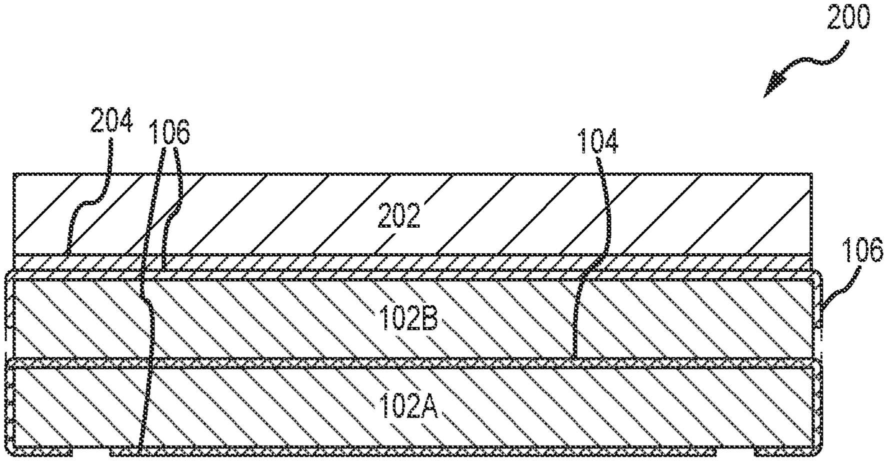
FIG. 2 illustrates a junction circulator or circulator assembly including the ferrite stripline assembly of FIG. 1, magnet, and pole piece according to one aspect of the disclosure.

FIG. 2 illustrates a junction circulator or circulator assembly including the stripline assembly of FIG. 1, magnet, and pole piece according to one aspect of the disclosure. As shown, a junction circulator or circulator assembly 200 may include a magnet 202, which serves as a DC magnetic bias source. The magnet 202 may be glued to the ferrite stripline assembly 100. Thus, magnet 202 does not have electrical contact with the ferrite stripline assembly 100.

The circulator or circulator assembly 200 may include optional pole piece(s) 204 to add to the magnetic bias source. The pole piece(s) 204 are placed on top of the ferrite stripline assembly 100. The magnet 202 is placed on top of the pole piece(s) 204. The pole piece(s) and the magnet 202 are aligned with the ferrite stripline assembly 100. The magnet 202 and pole pieces 204 form a magnetic bias assembly.

The circulator assembly 200 eliminates the compression force used in the conventional circulators. In the ferrite stripline assembly 100, the metal layers on all relevant surfaces are in intimate contact and are securely attached. The two ferrites of the stripline assembly are securely attached via an intermetallic bonding in between, or via a thick film paste. The thick film printing ferrite surfaces form the function of the circulator.

The circulator assembly 200 of the present disclosure provides more consistent performance than the conventional circulators. The junction circuit 104 forms directly on the ferrites so that the junction circuit 104 can be aligned with the ferrites during imaging. In some variations. The junction circuit 104 may include a first junction circuit and a second junction circuit, which are illustrated in FIGS. 4C-4D and FIGS. 6A-6B. The assembly alignment includes the rotational and radial alignments of the two ferrites with the first and second junction circuits. With the ports being formed and aligned directly on the ferrites, the ports and ferrites are not susceptible to the bending and alignment inaccuracies of the conventional circulators. The disclosed circulator assembly is substantially simpler than the conventional circulator.

In contrast, in the conventional circulators, to achieve consistent performance, both from port to port and from part to part, the junction circuit is placed very precisely laterally relative to both ferrites and in turn, the ferrite stripline assembly including the two ferrites and the junction circuit are placed very accurately relative to the housing, both rotationally and laterally.

Figure 3:
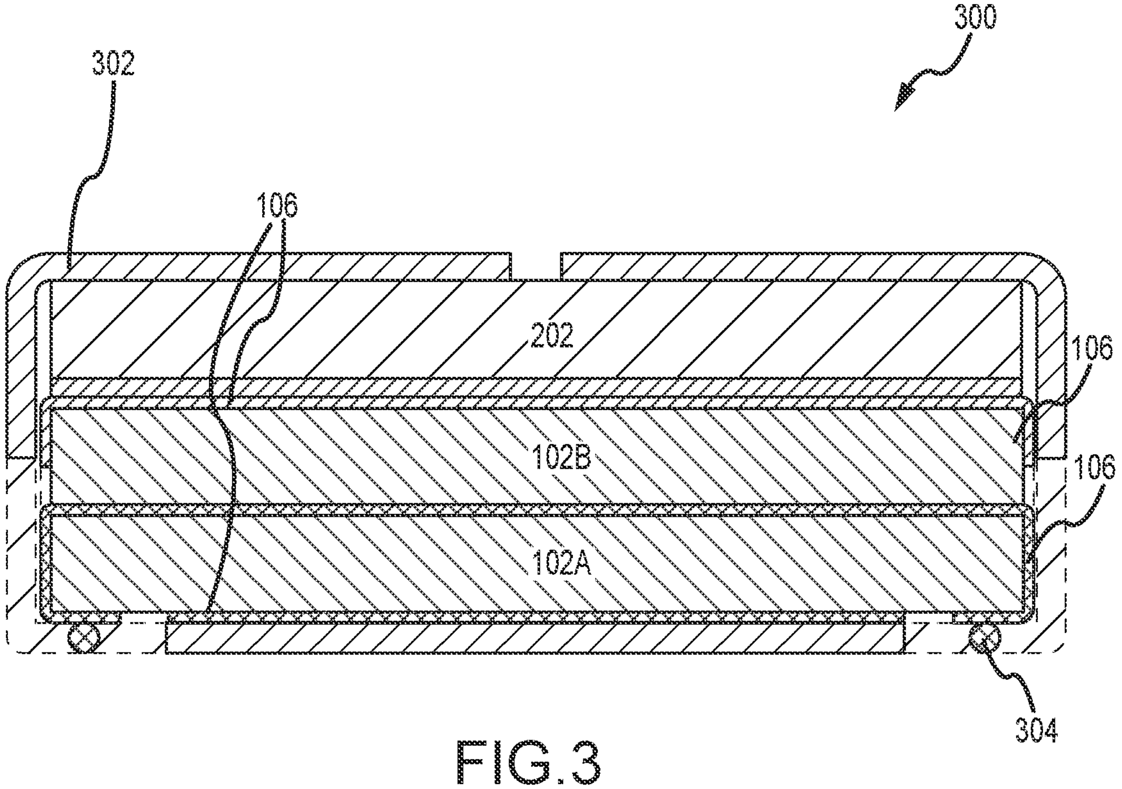
FIG. 3 illustrates the junction circulator or circulator assembly of FIG. 2 and an optional magnetic return path according to one aspect of the disclosure.

FIG. 3 illustrates the junction circulator or circulator assembly of FIG. 2 with an optional magnetic return path according to one aspect of the disclosure. A circulator assembly 300 may include a magnetic return path from the bottom of the first ferrite to the top of the magnet. As shown, a magnetic return path 302 encapsulates the circulator assembly 200, from the top and the bottom, and sides of the circulator assembly 200. A circuit ball 304 is on the bottom at each port of the bottom ferrite 102A. The ferrite stripline assembly 100 and the pole pieces and magnet are all integrated into a single component. As such, there is no need for the magnetic return path to apply pressure to the circulator assembly.

The disclosed circulator assembly may be used in wireless infrastructure, specifically sub-6 GHz 5G Massive MIMO systems.

Example Construction of Circulator Assembly

The following examples are for illustration purposes only. It will be apparent to those skilled in the art that many modifications, both to materials and methods, may be practiced without departing from the scope of the disclosure.

Figure 4A:
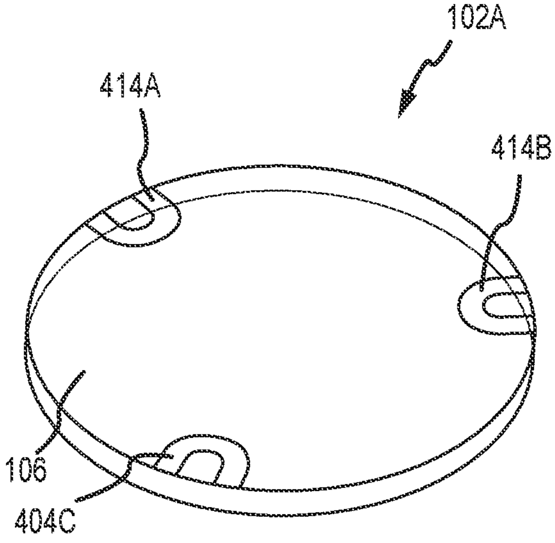
FIG. 4A illustrates a perspective view from the bottom of a first ferrite, according to one aspect of the disclosure.
Figure 4B:
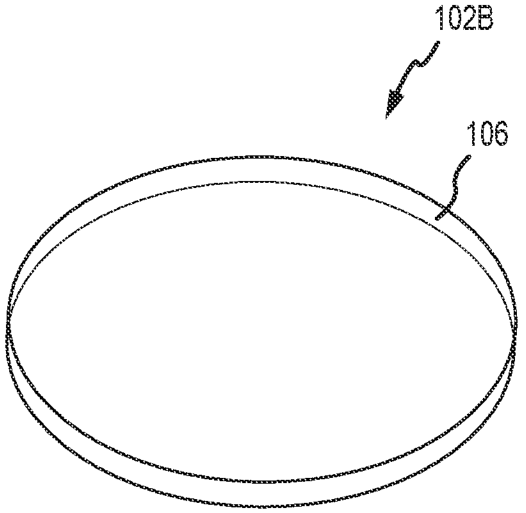
FIG. 4B illustrates a perspective view from the top of a second ferrite, according to one aspect of the disclosure.
Figure 4C:
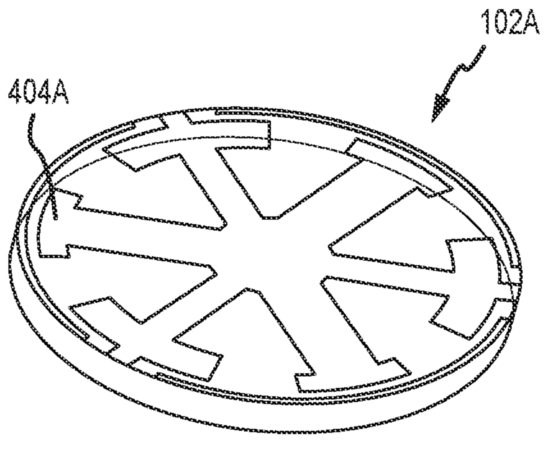
FIG. 4C illustrates a perspective view showing ground planes and a first junction circuit on top of the first ferrite, according to one aspect of the disclosure.
Figure 4D:
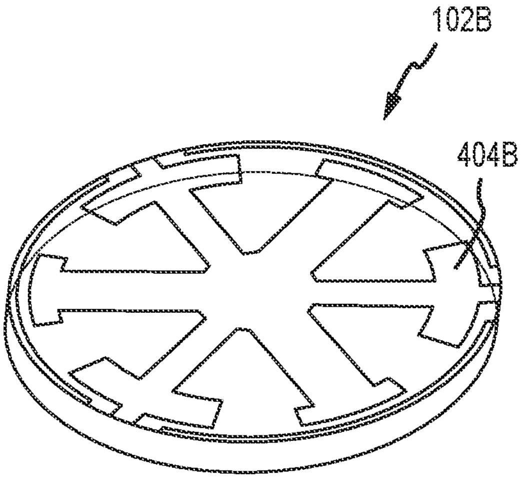
FIG. 4D illustrates a perspective view showing ground planes and a second junction circuit on the bottom of the second ferrite, according to one aspect of the disclosure.

FIG. 4A illustrates a perspective view from the bottom of the first ferrite. FIG. 4B illustrates a perspective view from the top of the second ferrite. FIG. 4C is a perspective view showing ground planes and a junction circuit on top of the first ferrite. FIG. 4D is a perspective view showing ground planes and a junction circuit on the bottom of the second ferrite, according to one aspect of the disclosure.

The ferrite stripline assembly may also be referred to as a stripline sandwich structure. The stripline sandwich structure, in one embodiment, uses thick film printing methods to form a ground plane with port openings or port features 404A-C, on one side of a first ferrite, as shown in FIG. 4A, and a solid ground plane on a second ferrite, as shown in FIG. 4B. As shown in FIG. 4A, three-port openings or port features 404A-C are located near the perimeter of the bottom ferrite 102A. Also, the RF ground 106 is a ground plane covering the bottom of the bottom ferrite 102A. As shown in FIG. 4B, the RF ground 106 is a ground plane covering the top of the top ferrite 102B. The metallization of the two ferrites is sintered in a furnace.

Next, on the opposite side to the port features 404A-C, forming a junction circuit on the first ferrite, as shown in FIG. 4C, and optionally forming a similar junction circuit on the second ferrite, as shown in FIG. 4D. As shown in FIG. 4C, a junction circuit 414A is on the top of the bottom ferrite 102A. As shown in FIG. 4D, a junction circuit 414B is on the bottom of the top ferrite 102B. The port features 404A-C can be used as input ports and/or output ports and integrated with the ferrites 102A. When forming two circuits 414A-B, ferrites with the thick film paste circuit on both ferrites can be dried before firing, which improves the tolerances of forming the circuits, but requires very accurate alignment of the two circuits (both rotational and laterally) when assembled prior to firing, this method provides good results. On the other hand, printing the thick film on only one ferrite makes alignment easy as there is no rotational alignment. However, the paste cannot be pre-dried as it does not adequately stick to the other ferrite. Since the paste is not dried, the paste is more "runny" and can spread out during assembly prior to firing. In some variations, the process may include drying the paste and then applying a wetting agent.

In some embodiments, the junction circuit on the second ferrite may be slightly different from the junction circuit on the first ferrite to account for alignment tolerances.

Figure 5A:
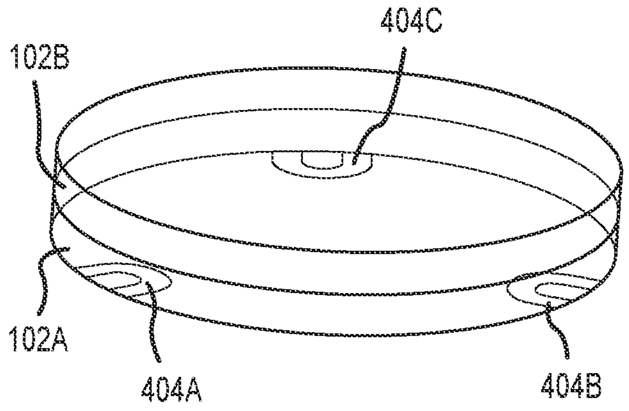
FIG. 5A illustrates a perspective view of firing the first ferrite and the second ferrite together according to one aspect of the disclosure.
Figure 5B:
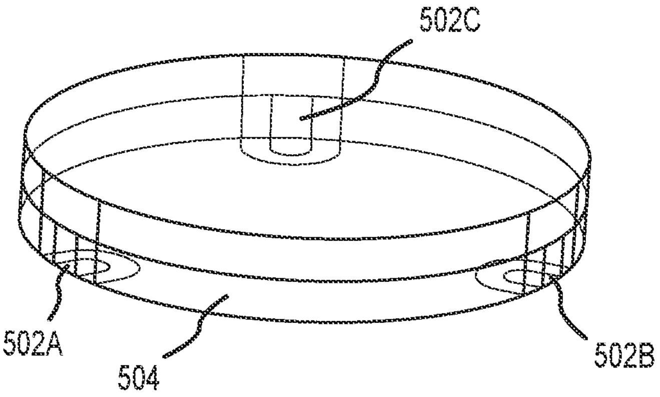
FIG. 5B illustrates a perspective view of a thick film printing perimeter circuitry, according to one aspect of the disclosure.
Figure 5C:
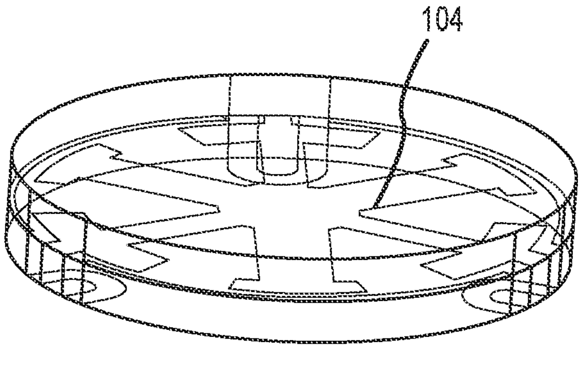
FIG. 5C is an X-ray illustration of a construction of a ferrite stripline assembly, according to one aspect of the disclosure.

FIG. 5A illustrates a perspective view of firing the first ferrite and the second ferrite together. FIG. 5B illustrates a perspective view of thick film printing perimeter circuitry. FIG. 5C is an X-ray illustration of a construction of a ferrite stripline assembly, according to one aspect of the disclosure.

The two ferrites 102A and 102B are stacked on top of each other, as illustrated in FIG. 5A, with the sides, on which the two junction circuits are placed, against each other, while paying attention to the alignment of the ports 404A-C. The two stacked ferrites 102A and 102B, without the junction circuits, are sintered in a furnace. The ferrites are commercially available. The ground planes, port features, and perimeter grounds are connected with a thick-film silver paste and fired/sintered at an elevated temperature, such as 850° C., which forms the structure as illustrated in FIG. 5B. Then, the one or two junction circuits are formed using the thick-film silver paste, dried and stacked on top of each other, and fired/sintered again at an elevated temperature, such as 850° C., which forms the assembly illustrated in FIG. 5C.

A full or partial ground wall 504 is formed on the perimeter of the two stacked ferrites 102A-B with port openings or port features 404A-C and respective leads 502A-C at port features 404A-C, as shown in FIG. 5B. The two stacked ferrites are again sintered in a furnace forming the ferrite stripline sandwich structure including junction circuit 104, as shown in FIG. 5C. In various aspects, a two-step sintering process is used to provide easier handling such that there is a surface to support the structure during sintering without marring or impairing the surface or sintering the structure together with its support.

A thick film paste may be applied to one ferrite 102A and fired with the other ferrite 102B. Alternatively, the thick film paste may be applied to both ferrites 102A-B, then the ferrites 102A-B can be stacked and sintered or fired facing each other. The paste used for the thick film operations of the ferrites is highly conductive, and also has enough glass content to ensure a strong bond between the ferrites. For example, the paste may be a silver-based paste with glass particles. The thick film silver-based paste may include a small amount of glass which melts during the sintering process and binds to the ferrite material (a ceramic), and the silver-based paste at about 850° C. is sufficiently close to its melting temperature to sinter together to form a diffusion bond. Thus, the glass and the silver-based paste bind to the ferrites.

Figure 6A:
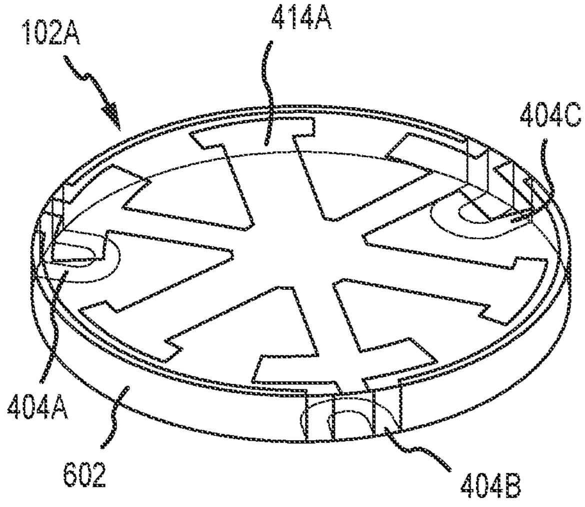
FIG. 6A illustrates a perspective view of forming a ground plane, a perimeter ground, port features, and a first circuit on a first ferrite, according to one aspect of the disclosure.
Figure 6B:
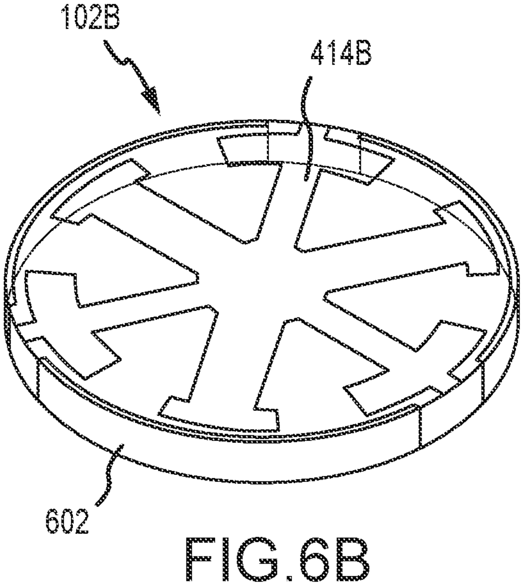
FIG. 6B illustrates a perspective view of forming a ground plane, a perimeter ground, port features, and a second circuit on a second ferrite, according to one aspect of the disclosure.
Figure 6C:
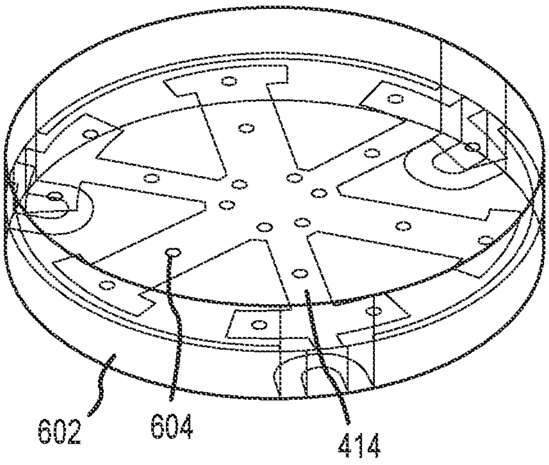
FIG. 6C is an X-ray illustration of the construction of a ferrite stripline assembly using solder dots as an intermetallic bond, according to one aspect of the disclosure.

In a second embodiment, a seed layer may be first sputtered onto all surfaces of the ferrites, followed by electroplating a highly conductive metal, e.g. copper, onto the seed layer, forming ferrites that are completely encased in metal. Using standard lithographic methods, features, such as circuitry; ground planes, perimeter ground ports junction circuit, among others, are then formed in the metallization as follows. FIG. 6A illustrates a perspective view of forming a ground plane, a perimeter ground, port features, and a first circuit on a first ferrite. FIG. 6B illustrates a perspective view of forming a ground plane, a perimeter ground, port features, and a second circuit on a second ferrite. FIG. 6C is an X-ray illustration of the construction of the ferrite stripline assembly using solder dots as an intermetallic bond. The construction of the ferrite stripline assembly uses solder or intermetallic diffusion bonds (e.g. indium). As shown in FIG. 6A, a perimeter ground 602 is formed on the side of the bottom ferrite 102A. The junction circuit 414A is placed on top of the bottom ferrite 102A. The port features 404A-C are spaced apart equally along the perimeter of the bottom ferrite 102A and located near the bottom and side of the bottom ferrite 102A. As shown in FIG. 6B, a perimeter ground 602 is also formed on the side of the top ferrite 102B. The junction circuit 414B is placed on the bottom of the top ferrite 102B. In this example, the junction circuit 414A has substantially the same pattern as junction circuit 414B.

Figure 6D:
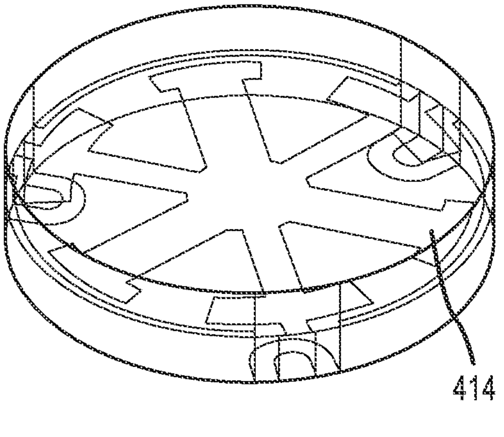
FIG. 6D is an X-ray illustration of the construction of a ferrite stripline assembly using solder or intermetallic diffusion bond (e.g. indium), according to one aspect of the disclosure.

As shown in FIG. 6C, solder dots 604 are used to bond junction circuits 414A and 414B together to form junction circuit 414. As shown in FIG. 6D, junction circuits 414A and 414B are bonded by intermetallic diffusion bond, using a metal, such as indium, among others.

Figure 7:
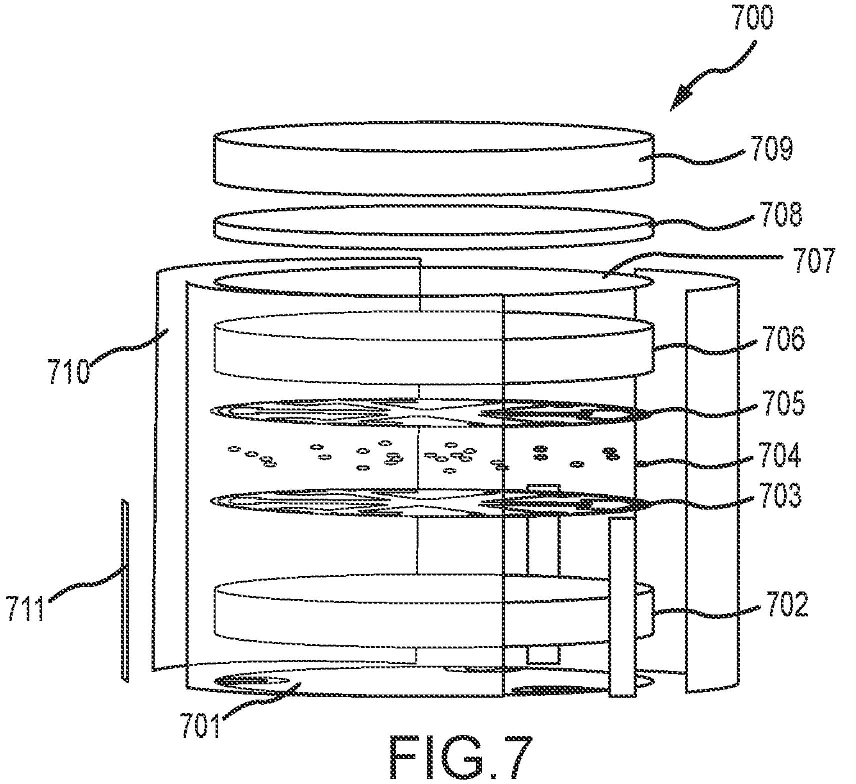
FIG. 7 is an exploded view of a circulator or circulator assembly according to one aspect of the disclosure.

FIG. 7 is an exploded view of a circulator assembly according to one aspect of the disclosure. As shown, a circulator assembly 700 includes 1) a bottom ground plane and landing pads (port openings) 701, 2) a bottom ferrite or first ferrite 702, 3) Y-junction circuit 703, 4) solder dots 704, 5) Y-junction circuit 705, 6) top ferrite or second ferrite 706, 7) top ground plane 707, 8) pole piece(s) 708, 9) magnet 709, 10) three perimeter grounds 710, and 11) three-port leads 711.

Magnetic Return Path

Figure 8:
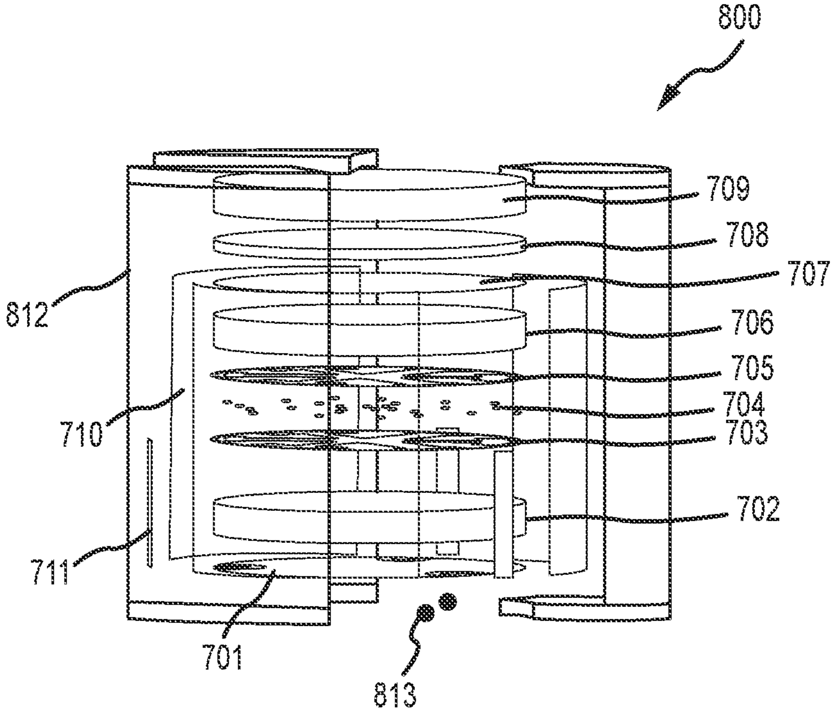
FIG. 8 is an exploded view of the circulator or circulator assembly of FIG. 7 with a magnetic return path according to one aspect of the disclosure.

FIG. 8 is an exploded view of a circulator assembly with magnetic return path pieces according to one aspect of the disclosure. As shown, a circulator assembly 800 includes 1) a bottom ground plane and landing pads (port openings) 701, 2) a bottom ferrite or first ferrite 702, 3) Y-junction circuit 703, 4) solder dots 704, 5) Y-junction circuit 705, 6) top ferrite or second ferrite 706, 7) top ground plane 707, 8) pole piece(s) 708, 9) magnet 709, 10) three perimeter grounds 710, 11) three-port leads 711, 12) three magnetic return paths including clips 812, and 13) port extension balls 813 corresponding to three-port leads. The magnetic return paths 812 are added to encapsulate the circulator assembly 700 as illustrated in FIG. 7.

Figure 9A:
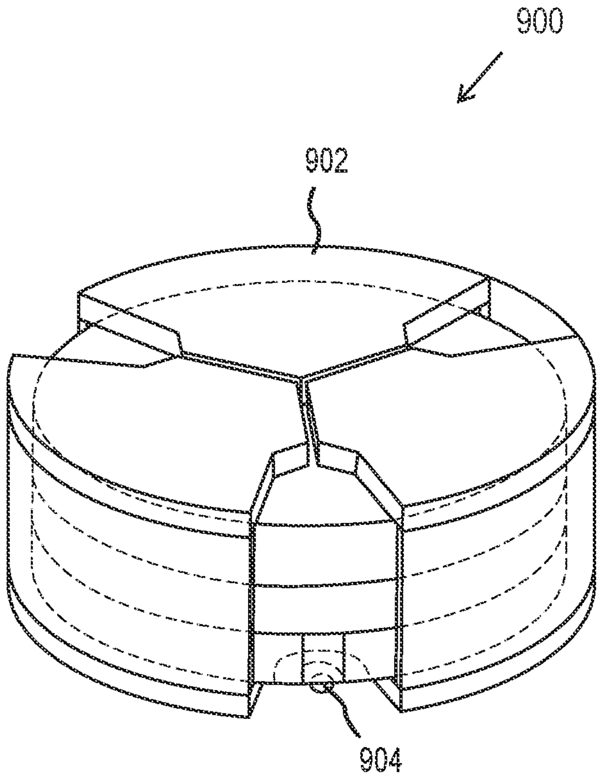
FIG. 9A is an X-ray illustration of clips forming a magnetic return path and encapsulating a ferrite stripline assembly and a magnetic bias assembly.
Figure 9B:
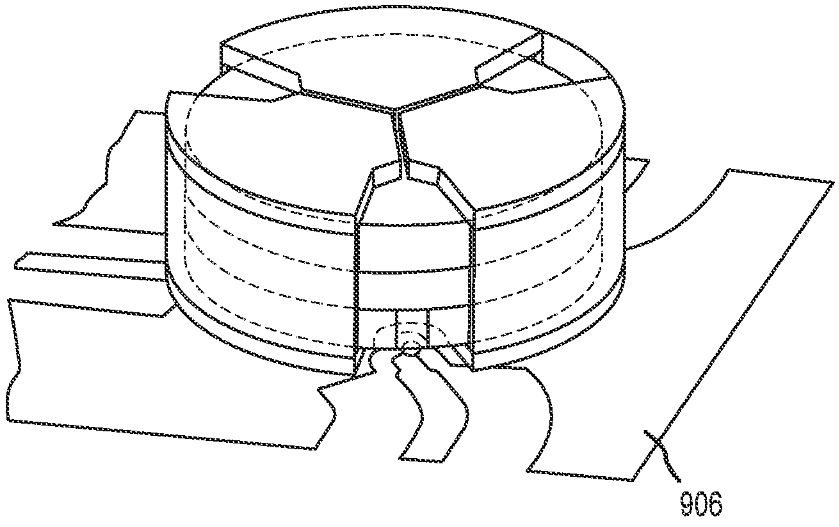
FIG. 9B is an X-ray illustration of clips forming a magnetic return path and encapsulating the ferrite stripline assembly and magnetic bias assembly mounted on a host board, according to one aspect of the disclosure.

FIG. 9A is an X-ray illustration of clips forming a magnetic return path and encapsulating the ferrite stripline assembly and magnetic bias assembly, and FIG. 9B is an X-ray illustration of clips forming a magnetic return path and encapsulating the ferrite stripline assembly and magnetic bias assembly mounted on a host board 906. As shown in FIG. 9A, clips 902 form a magnetic return path as a low-cost alternative to housing. The magnetic bias assembly may include the magnet and the pole pieces.

Clips 902 may be pre-formed from a metal, such as low carbon steel (e.g., 1018), stainless steel (e.g., 304), or other medium to high permeability metal, and applied from several sides, e.g., three sides, of the circulator assembly 700 using fixturing to ensure that the clips are reasonably aligned and centered. Alternatively, if the material for the magnetic return path is thin and soft, it can be bent in place around the circulator assembly and can thus be one single piece with three arms that wrap around the circulator assembly.

The clips 902 forming the magnetic return path may be secured using a conductive glue compound or an intermetallic bond. The bottom of the magnetic return path may be conducive to a solder surface mount to the host assembly, as the bottom functions as an RF return path (ground) for the circulator.

Next, three-port pads 904 may be extended by using ball mount techniques, such as those used in a ball grid array (BGA) package, to make the bottom of the magnetic return path (ground) flush with the ports, thus allowing simultaneous solder of ports and ground.

The magnetic return path may have system-level benefits. For a low-field (below FMR) circulator, the magnetic return path may help make the circulator less susceptible to external hard or soft magnetic influences. The magnetic return path may also help make the magnetic bias within the ferrites more uniform. For a high field (above FMR) circulator, the magnetic bias needs to be very high such that it is difficult to achieve the magnetic bias without the magnetic return path.

The circulator assembly 200, 300, 700, 800, or 900 has some benefits in electrical aspects, including the junction circuit to ferrite contact without a compression housing, insertion loss benefit from intimate contact, flexible grounding and coupling options, junction circuit to ground coupling, control of resonance mode or evanescent mode, short RF ground path, tighter tolerances possible, more consistent and repeatable performance, requirements of less tuning, among others.

The circulator assembly 200, 300, 700, 800, or 900 has some benefits in mechanical aspects, including less housing compression, less risk of cracking ferrites, self-contained ground path, and no ground path through magnet (or separate shim), among others.

The circulator assembly 200, 300, 700, 800, or 900 has some cost benefits, including fewer pieces, less assembly, no housing or simplified housing, a simplified assembly process that can be fully automated including 100% RF testing reducing labor cost, improved process yield, among others.

The circulator assembly 200, 300, 700, 800, or 900 provides better circuit design flexibility than conventional circulators because the junction circuit includes ground forms directly on the ferrites and thus is supported by the ferrites.

In some aspects, the ferrite stripline assembly uses plating, etching, and an intermetallic bond. Metallization is applied to all surfaces of the first and second ferrite layers. Metallization is the process by which the components of an integrated circuit are interconnected by a metal conductor. This process produces a thin-film metal layer that serves as the required conductor pattern for the interconnection of the various components on the chip.

Figure 10:
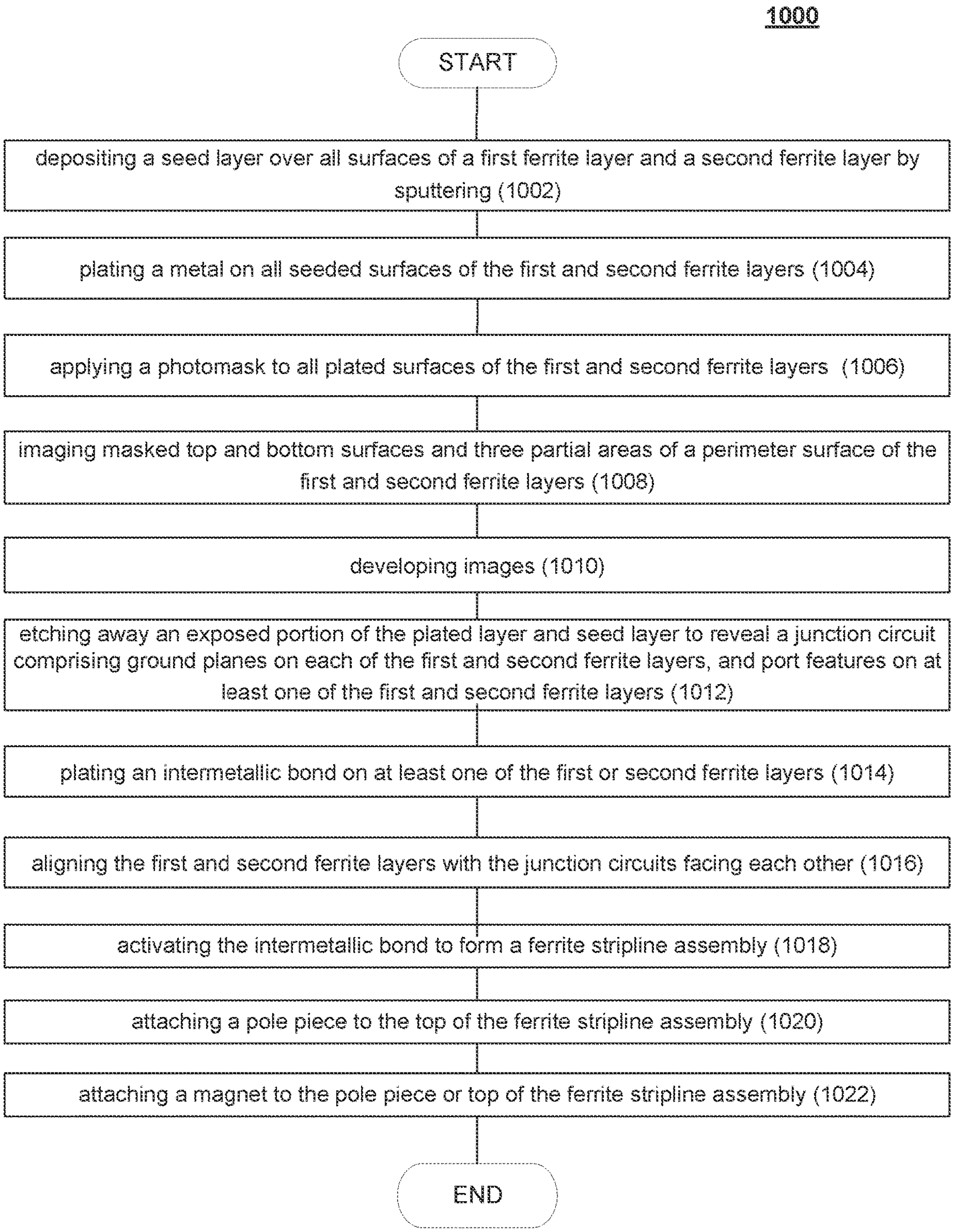
FIG. 10 is a flow chart illustrating the steps of manufacturing a circulator or circulator assembly according to one aspect of the disclosure.

FIG. 10 is a flow chart illustrating the steps for fabricating a circulator assembly according to one aspect of the disclosure. The circulator assembly includes example circulator assembly 200, 300, 700, or 800.

A method 1000 may include depositing a seed layer over all surfaces of a first ferrite layer and a second ferrite layer by sputtering at operation 1002. All surfaces include a top surface, a bottom surface, and a side surface of the first and second ferrite layers 102A-B. In some embodiments, the seed layer may be chromium, titanium, or tungsten, among others. In particular, chromium binds well to both the ferrites and copper.

Method 1000 may also include plating a metal on all seeded surfaces of the first and second ferrite layers at operation 1004. In some embodiments, the metal used for ground planes, junction circuits, and perimeter patterns has high conductivity, such as copper or silver, among others. It is understood that a selective plating process may be used instead of etching to form patterns in the metallization.

In some variations, the ferrites may include non-ferromagnetic ceramic features, e.g. a ring.

In some variations, the magnets may be ceramic magnets or rare earth metal magnets.

In some variations, a metal seed layer may include chrome and copper which may be sputtered on the ferrites.

In some variations, the seeded ferrite layers may be copper plated. The junction circuit may be formed from the plated copper.

Method 1000 may also include applying a photomask to all plated surfaces of the first and second ferrite layers at operation 1006. Again, all plated surfaces include a top surface, a bottom surface, and a side surface of the first and second ferrite layers 102A-B.

Method 1000 may also include imaging masked top and bottom surfaces and three partial areas of the perimeter surface of the first and second ferrite layers at operation 1008. For imaging, a ground plane with port openings or port features is illuminated on the first ferrite layer, while a solid ground plane is illuminated on the second ferrite layer. Next, on the opposite sides, a junction circuit is illuminated on the first ferrite layer, while a similar junction circuit is illuminated on the second ferrite layer. Port openings and port leads are illuminated on the perimeter of the first ferrite layer, and port openings are illuminated on the perimeter of the second ferrite layer. Method 1000 may also include developing images at operation 1010.

Next, method 1000 may include etching away an exposed portion of the plated layer and seed layer to reveal a junction circuit comprising ground planes on each of the first and second ferrite layers, and port features on at least one of the first and second ferrite layers at operation 1012. After etching, the developed photomask is removed.

Method 1000 may also include plating an intermetallic bond on at least one of the first or second ferrite layers at operation 1014. For example, method 1000 may plate indium or tin, among others, on one of the first ferrite layer 102A or second ferrite layer 102B.

Method 1000 may also include aligning the first and second ferrite layers with the junction circuits facing each other at operation 1016. While paying close attention to the alignment of the ports, an intermetallic bond forms between the two junction circuits 414A and 414B by using either solder or plating indium to the junction circuit surfaces and scrubbing/pressing the two ferrite layers 102A and 102B together to form a diffusion bond.

Method 1000 may further include activating the intermetallic bond to form a ferrite stripline assembly at operation 1018. Method 1000 may also include passivating the ferrites with organic solderability preservative (OSP) or tin/silver plating. OSP is a method for coating printed circuit boards. It uses a water-based organic compound that selectively bonds to copper and protects the copper until soldering.

In some variations, the two plated ferrites may be bonded by an intermetallic bond.

In some variations, the intermetallic bond may be an indium diffusion bond.

Method 1000 may also include an optional step, i.e. attaching a pole piece to the top of the ferrite stripline assembly at operation 1020. Method 1000 may also include attaching a magnet to the pole piece or top of the ferrite stripline assembly at operation 1022.

In some variations, an intermetallic bonding may be used for attaching the pole piece or magnet. A non-magnetic metal may be applied to all interface surfaces of magnet 202, pole piece(s) 204, and the top ferrite 102B. The non-magnetic metal, such as tin, silver, indium or alloys, among others, is conducive to either solder or diffusion bonding or an intermetallic bonding, which is activated with heat, pressure, and scrubbing as applicable. This intermetallic bonding provides a good thermal path to the top of the circulator 200, thus allowing heat to be directed away from the circulator both through the bottom and through the top of the circulator.

In some variations, a low viscosity dielectric compound may be used to glue parts or pieces including the magnet 202, pole piece(s) 204, and the top ferrite 102B together. While paying close attention to alignments of the parts or pieces, the low viscosity dielectric compound (i.e. glue compound) is applied to the top of the ferrite stripline assembly 100, and on top of each pole piece 204, and light pressure is applied while the glue compound sets. One may apply slightly less glue compound to fill the entire interface to avoid the glue compound being squeezed out of the interface onto the perimeter.

The disclosed circulator assembly keeps junction circuitry in intimate contact with ferrite material without requiring compression from a housing body, resulting in reduced size and weight, while maintaining electrical performance.

Example performance data including return loss (RL), isolation, and insertion loss (IL) are provided for the circulator or circulator assembly.

Figure 11:
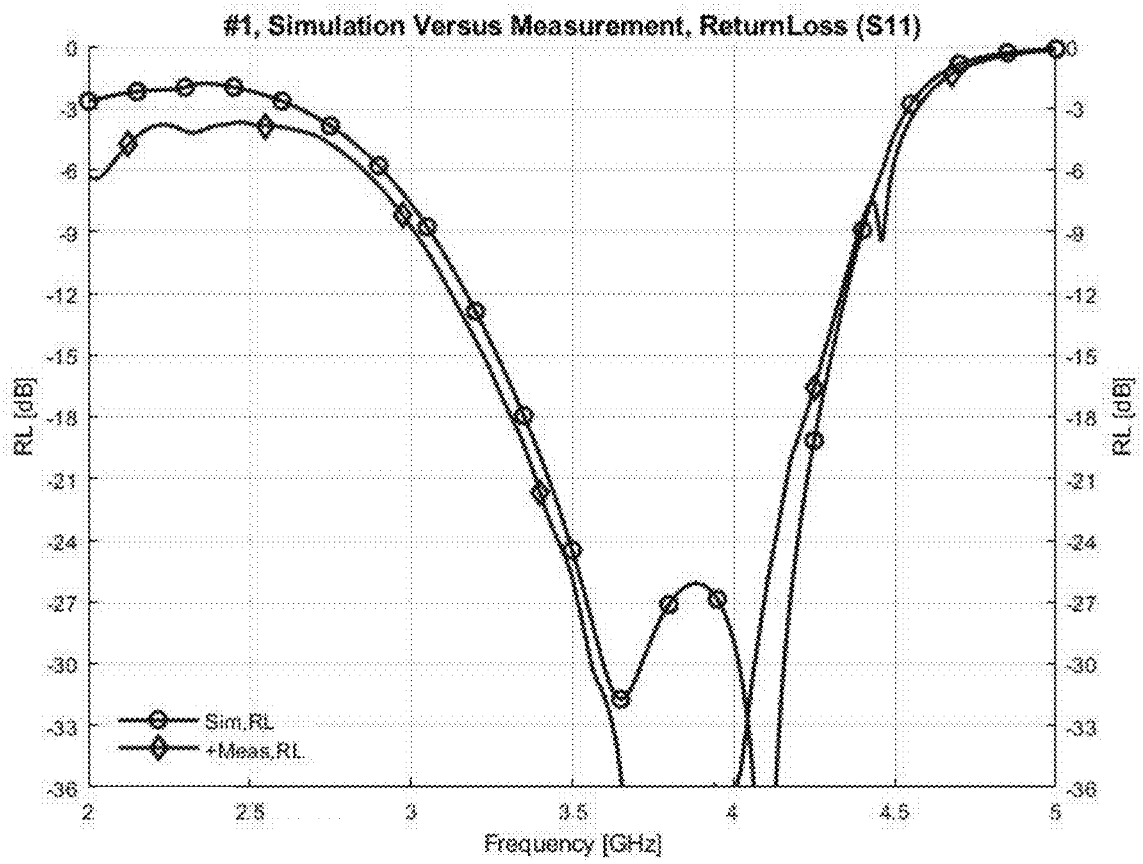
FIG. 11 illustrates simulated return loss and measured return loss versus frequency according to one aspect of the disclosure.
Figure 12:
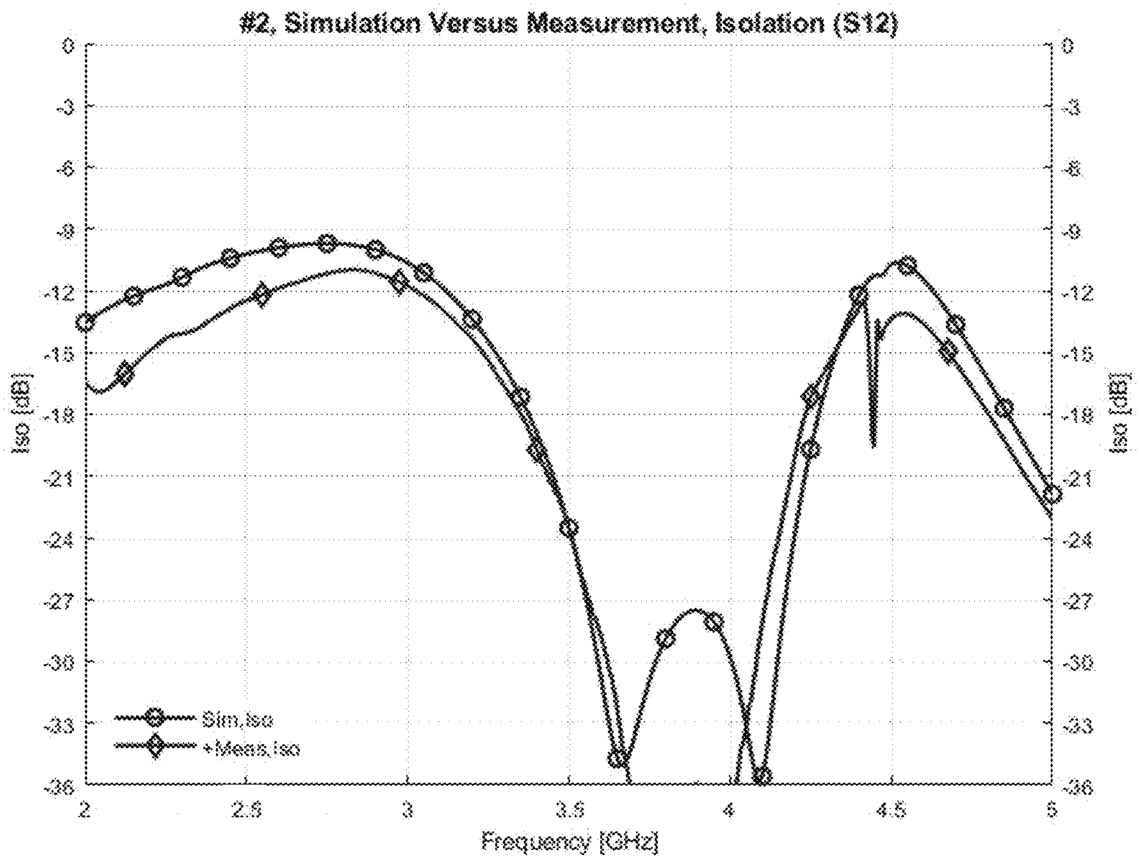
FIG. 12 illustrates simulated isolation and measured isolation versus frequency according to one aspect of the disclosure.
Figure 13:
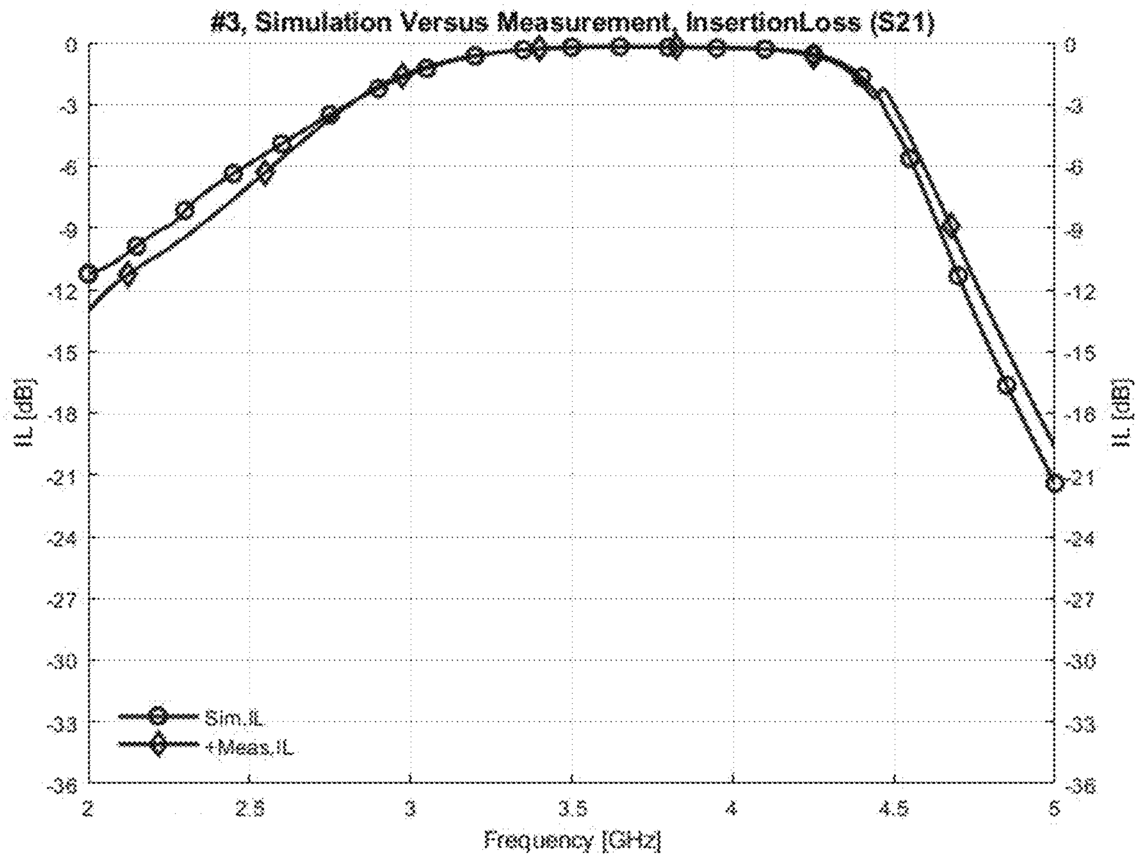
FIG. 13 illustrates simulated insertion loss and measured insertion loss versus frequency according to one aspect of the disclosure.

FIGS. 11-13 show a comparison of measured and simulated data including return loss, isolation, and insertion loss versus frequency for the circulator, respectively. The circulator includes lithographically formed copper features on ferrites with a ceramic magnet, but without a magnetic return path. The copper features are; ground planes, port pads, port transitions and y-junction circuit. The frequency ranges from 2 GHz to 5 GHz. The measured data were close to the simulated data.

The contact between the junction circuit and the ferrite does not use compression housing. The insertion loss benefits from intimate contact, flexible grounding and coupling options, and junction circuit to ground coupling.

Any ranges cited herein are inclusive. The terms "substantially" and "about" used throughout this specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system which, as a matter of language, might be said to fall therebetween.

What is claimed is:

1. A circulator for radio frequency, the circulator comprising:
- a ferrite stripline assembly comprising:
  - a first ferrite layer;
  - a second ferrite layer disposed over a first side of the first ferrite layer;
  - a junction circuit between the first ferrite layer and the second ferrite layer, wherein the junction circuit comprises a first circuit formed on the first side of the first ferrite layer, a second circuit formed on a second side of the second ferrite layer;
  - a first ground layer contacting the first ferrite layer and opposite to the junction circuit;
  - a magnet over a first side of the second ferrite layer for providing magnetic bias;
  - a second ground layer between the second ferrite layer and the magnet, the second ground layer opposite to the junction circuit; and
  - one or more perimeter grounds located on a respective perimeter of the first ferrite layer and the second ferrite layer, wherein the one or more perimeter grounds are integrated with the first ground layer and the second ground layer.

2. The circulator of claim 1, wherein the ferrite stripline assembly further comprises a metal seed layer over surfaces of each of the first ferrite layer and the second ferrite layer.

3. The circulator of claim 2, wherein the metal seed layer is between the junction circuit and the first ferrite layer and/or between the junction circuit and the second ferrite layer.

4. The circulator of claim 1, wherein the junction circuit comprises an intermetallic bond formed between the first circuit and the second circuit.

5. The circulator of claim 1, wherein the first and second ferrite layers are attached by an intermetallic bond or a paste.

6. The circulator of claim 5, wherein the intermetallic bond comprises one of indium, preform of solder, or solder dots.

7. The circulator of claim 1, further comprising an input port and an output port coupled to a perimeter of the first ferrite layer.

8. The circulator of claim 7, further comprising one or more perimeter port leads coupled to the perimeter of the first ferrite layer to connect the junction circuit to the input port and the output port on a second side of the first ferrite opposite to the junction circuit.

9. The circulator of claim 1, further comprising a pole piece between the magnet and the second ferrite layer to form a magnetic bias assembly comprising the magnet and the pole piece.

10. The circulator of claim 1, further comprising clips forming a magnetic return path and encapsulating the ferrite stripline assembly and the magnet.

11. A circulator for radio frequency, the circulator comprising:
- a ferrite stripline assembly comprising:
  - a first ferrite layer;
  - a second ferrite layer disposed over the first ferrite layer;
  - a junction circuit between the first ferrite layer and the second ferrite layer;
  - a metal seed layer over all surfaces of each of the first ferrite layer and the second ferrite layer; and
  - a magnet over the second ferrite layer for providing magnetic bias.

12. The circulator of claim 11, further comprising an input port and an output port coupled to a perimeter of the first ferrite layer.

13. The circulator of claim 12, further comprising one or more perimeter port leads coupled to the perimeter of the first ferrite layer to connect the junction circuit to the input port and the output port on the bottom of the first ferrite.

14. The circulator of claim 12, wherein the first and second ferrite layers are attached by an intermetallic bond or a paste.

15. The circulator of claim 14, wherein the intermetallic bond comprises one of indium, preform of solder, or solder dots.

16. A circulator for radio frequency, the circulator comprising:
- a ferrite stripline assembly comprising:
  - a first ferrite layer;
  - a second ferrite layer disposed over the first ferrite layer, wherein the first and second ferrite layers are attached by an intermetallic bond or a paste;
  - a junction circuit between the first ferrite layer and the second ferrite layer; and
  - a magnet over the second ferrite layer for providing magnetic bias.

17. The circulator of claim 16, wherein the intermetallic bond comprises one of indium, preform of solder, or solder dots.

18. The circulator of claim 16, further comprising an input port and an output port coupled to a perimeter of the first ferrite layer.

19. The circulator of claim 18, further comprising one or more perimeter port leads coupled to the perimeter of the first ferrite layer to connect the junction circuit to the input port and the output port on the bottom of the first ferrite layer.

20. The circulator of claim 16, wherein the ferrite stripline assembly further comprises a metal seed layer over surfaces of each of the first ferrite layer and the second ferrite layer.

21. The circulator of claim 20, wherein the metal seed layer is between the junction circuit and the first ferrite layer and/or between the junction circuit and the second ferrite layer.

* * * * *